US008391500B2

(12) United States Patent  
Hannemann et al.

(10) Patent No.: US 8,391,500 B2  
(45) Date of Patent: Mar. 5, 2013

(54) METHOD AND SYSTEM FOR CREATING THREE-DIMENSIONAL SPATIAL AUDIO

(75) Inventors: Jens Hannemann, Lexington, KY (US); Kevin D. Donohue, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 1013 days.

(21) Appl. No.: 12/253,753

(22) Filed: Oct. 17, 2008

(65) Prior Publication Data

US 2010/0098274 A1    Apr. 22, 2010

(51) Int. Cl.
*H04R 5/00*      (2006.01)
*H04R 5/02*      (2006.01)
(52) U.S. Cl. ............... 381/18; 381/1; 381/17; 381/310
(58) Field of Classification Search ............... 381/1, 17, 381/18, 310
See application file for complete search history.

(56) References Cited

U.S. PATENT DOCUMENTS 5,889,867 A * 3/1999 Bauck .............................. 381/1

OTHER PUBLICATIONS

Berkhout, et al.,; Acoustic control by wave-field synthesis; J. Acoust. Soc. Am; May 1993; pp. 2764-2778; 93(5).
Boone, et al.; Spatial sound-field reproduction by wave-field synthesis; J. audio Eng. Soc; Dec. 1995; pp. 1003-1012; 43(12).
Poletti, M.A.; Three-dimensional surround sound systems based on spherical harmonics; J. Audio Eng. Soc; Nov. 2005; pp. 1004-1024; 53(11).
Hannemann, et al.; A comparative study of the perceptional quality of wave field synthesis versus multipole matching for audio rendering; International Conference on Acoustics, Speech, and Signal Processing (ICASSP); Apr. 2008; pp. 397-400.
Hannemann, et al; A monte-carlo study on the convergence of multipole-matched audio rendering; IEEE; May 2008; pp. 507-510.
Nelson, et al; Spherical harmonics, singular-value decomposition and the head-related transfer function; Journal of Sound and Vibration; Jan. 2001; pp. 607-637; 239(4).
Spors, et al; High-quality acoustic rendering with wave field synthesis; Vision, Modeling, and visualization; 2002; pp. 101-108; Amersterdam; IOS Press.

(Continued)

*Primary Examiner* — S. V. Clark
*Assistant Examiner* — Jesse Y Miyoshi
(74) *Attorney, Agent, or Firm* — Stites & Harbison PLLC; Jeffrey A. Haeberlin (57) ABSTRACT

A system and method for rendering a virtual sound source using a plurality of speakers in an arbitrary arrangement includes expanding a wave field of the virtual sound source and a composite wave field generated by the plurality of speakers into multi-pole expansions, and equating the multi-pole expansions to each other to form a continuous equation. A set of constraints is applied to the continuous equation that minimize an error in a sweet spot region resulting in a linear system of equations. The linear system of equations is solved using singular-value decomposition to arrive at a pseudo-inverse representing a multi-dimensional transfer function between the virtual sound source and the plurality of speakers. The multi-dimensional transfer function is then applied to a signal of the virtual sound source to render the virtual sound source in the sweet spot region using the plurality of speakers in the arbitrary arrangement.

16 Claims, 3 Drawing Sheets

OTHER PUBLICATIONS

Teutsch, et al; Estimation of the number of wideband sources in an acoustic wave field usign eigen-beam processing for circular apertures; Workshop on Applications of Signal Processing to Audio and Acoustics; Oct. 2005; IEEE; New Paltz, NY.

Corteel; Equalization in an extended area using multichannel inversion and wave field synthesis; J. Audio Eng. Soc; Dec. 2006; pp. 1140-1461; 54(12).

Daniel, et al; Further investigations of high order ambisonics and wavefield synthesis for holophonic sound imaging; WFS and High Order Ambisonics; Mar. 22-25, 2003; AES 114th Convension, Amersterdam, The Netherlands.

Hanneman; Hybrid Field Analysis of the Canonical GTEM-Cell; Dissertation; Jul. 14, 2003.

Hannemann, et al; Virtual Sound Source Rendering Using a multipole-expansion and method-of-moments approach; pp. 1-26; Jun. 2008.

* cited by examiner

METHOD AND SYSTEM FOR CREATING THREE-DIMENSIONAL SPATIAL AUDIO

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to sound signals encoded over multiple speakers to create the perception of specific spatial properties.

2. Background Art

Interest in rendering sound signals with 3-D spatial properties has been motivated by many applications including enhancing intelligibility in teleconferencing systems, navigation systems for the visually impaired, and enhancing the sense of immersion in virtual environments. The challenges for rendering sound with a limited number of speaker elements involve creating stimuli that are perceived as realistic with accurate spatial properties. In addition, the complexity of the rendering algorithms present challenges for fast and efficient implementations.

The basic problem of spatial audio rendering is creating the perception that sound is coming from a location in a space where a speaker cannot be located. For example, if presenting a holographic representation of a person (e.g., as in the (currently) fictional but generally illustrative example of a "holodeck" from the American science fiction entertainment series and media franchise, "Star Trek"), it is desired to create the perception that a voice is coming from the mouth of the holographic representation, even though it is not possible to locate a physical speaker at the location of the mouth of the holographic representation. It is desired, however, to give the listener the impression that sound emanates from the mouth of the holographic representation.

In this example, the location of the listener where the perception of the sound emanating from the holographic representation is received is known as the "sweet spot," which, as used herein, means a region where the listener's perception of the rendered sound is correct.

One of the more popular approaches to rendering sound is wave-field synthesis (WFS). It is capable of accurately reconstruct a pressure field within a large area of interest with moderate processing power. The absence of a "sweet spot" makes it well suited for creating realistic spatial audio impressions for large audiences or listeners moving around in a large area. Unfortunately, it requires a rather high number of speakers. Another drawback of the method is that it is based on Green's Second Theorem, and the field can be reconstructed only either inside or outside a closed boundary containing the equivalent sources. When a source is located within a reconstruction domain (i.e., an "immersive environment"), a focused source must be located between the listener and the speakers to ensure correct perception. As an example illustrating this limitation, imagine a virtual videoconferencing environment, where the remote person's avatar is standing right beside the local participant. Methods based on Green's Second Theorem cannot render this source without additional modifications increasing computational complexity and invalidating correctness of the reconstructed field in some regions of the reconstruction domain. WFS can also require a relatively large number of speakers. This can be prohibitive for immersive virtual environments, especially if they need to be portable or set up in many smaller rooms. In addition, the reproduction of the sound field at every point in an immersive environment with only a few listeners is often not necessary.

Another popular approach to rendering sound is Dolby 5.1, which delivers spatial and ambient sound to a listener's vicinity (the "sweet spot") using a regularly-spaced setup of five loudspeakers and one subwoofer. Dolby 5.1 creates only directional perception, but distances are not accurately reproduced and the Doppler effect (moving a sound in 3-dimensional space) must be either recorded or manually reproduced by performing a frequency shift.

BRIEF SUMMARY OF THE INVENTION

According to one aspect of the invention, a method for rendering a virtual sound source using a plurality of speakers in an arbitrary arrangement includes: expanding a virtual sound source wave field of the virtual sound source into a virtual sound source wave field multi-pole expansion; expanding a composite wave field generated by the plurality of speakers into a composite wave field multi-pole expansion; equating the virtual sound source wave field multi-pole expansion to the composite wave field multi-pole expansion to form a continuous equation; applying a set of constraints to the continuous equation that minimize an error in a sweet spot region, resulting in a linear system of equations; solving the linear system of equations using singular-value decomposition to arrive at a pseudo-inverse representing a multi-dimensional transfer function between the virtual sound source and the plurality of speakers; and applying the multi-dimensional transfer function to a virtual sound source signal of the virtual sound source to render the virtual sound source in the sweet spot region using the plurality of speakers in the arbitrary arrangement.

In one implementation of the method, the sweet spot region is arbitrarily shaped, and applying the set of constraints further includes using a Point-Matching Method of Moments approach to minimize the error at discrete points in the sweet spot region.

In another implementation of the method, the sweet spot region is spherical, and applying the set of constraints further includes using a Galerkin-based Method of Moments approach to minimize an average error on a boundary of the sweet spot region.

In yet another implementation, the virtual sound source signal is a broadband signal having a plurality of frequency bins. Applying the multi-dimensional transfer function to the virtual sound source signal further includes, for each frequency bin, multiplying a right-hand side of the linear system of equations with the pseudo-inverse to arrive at a source-to-speaker transfer function for each of the plurality of speakers.

According to this implementation, applying the multi-dimensional transfer function to the virtual sound source signal may further include: computing an inverse Fourier transform of each source-to-speaker transfer function to arrive at a source-to-speaker impulse response for each of the plurality of speakers; convolving a frame of the virtual sound source signal with the source-to-speaker impulse response for each of the plurality of speakers to arrive at an output signal for each of the plurality of speakers; and outputting the output signal for each of the plurality of speakers.

Alternatively, applying the multi-dimensional transfer function to the virtual sound source signal may further include: computing a Fourier transform of a frame of the virtual sound source signal to obtain an input signal spectrum; multiplying the input signal spectrum with the source-to-speaker transfer function for each of the plurality of speakers to obtain an output signal spectrum for each of the plurality of speakers; computing an inverse Fourier transform of the output signal spectrum for each of the plurality of speakers to arrive at an output signal for each of the plurality of speakers; and outputting the output signal for each of the plurality of speakers.

This implementation may still further include determining that the sweet spot region has moved to a new location and computing a new pseudo-inverse using the new location of the sweet spot region.

This implementation may even further include determining that the virtual sound source has moved to a new location and, for each frequency bin, multiplying a new right-hand side of the linear system of equations for the new location of the virtual sound source with the pseudo-inverse to arrive at a new source-to-speaker transfer function for each of the plurality of speakers.

According to another aspect of the invention, a system for rendering a virtual sound source using a plurality of speakers in an arbitrary arrangement includes a computing machine and a signal processing machine. The computing machine is for solving a linear system of equations using singular-value decomposition to arrive at a pseudo-inverse representing a multi-dimensional transfer function between the virtual sound source and the plurality of speakers, the linear system of equations derived by: expanding a virtual sound source wave field of the virtual sound source into a virtual sound source wave field multi-pole expansion; expanding a composite wave field generated by the plurality of speakers into a composite wave field multi-pole expansion; equating the virtual sound source wave field multi-pole expansion to the composite wave field multi-pole expansion to form a continuous equation; and applying a set of constraints to the continuous equation that minimize an error in a sweet spot region, resulting in the linear system of equations. The signal processing machine is for applying the multi-dimensional transfer function to a virtual sound source signal of the virtual sound source to render the virtual sound source in the sweet spot region using the plurality of speakers in the arbitrary arrangement.

In one implementation of the system, the sweet spot region is arbitrarily shaped, and applying the set of constraints further includes using a Point-Matching Method of Moments approach to minimize the error at discrete points in the sweet spot region.

In another implementation of the system, the sweet spot region is spherical, and applying the set of constraints further includes using a Galerkin-based Method of Moments approach to minimize an average error on a boundary of the sweet spot region.

In yet another implementation, the virtual sound source signal is a broadband signal having a plurality of frequency bins. The signal processing machine is further for multiplying a right-hand side of the linear system of equations with the pseudo-inverse for each frequency bin to arrive at a source-to-speaker transfer function for each of the plurality of speakers. The signal processing machine may further be for: computing an inverse Fourier transform of each source-to-speaker transfer function to arrive at a source-to-speaker impulse response for each of the plurality of speakers; convolving a frame of the virtual sound source signal with the source-to-speaker impulse response for each of the plurality of speakers to arrive at an output signal for each of the plurality of speakers; and outputting the output signal for each of the plurality of speakers. Alternatively, the signal processing machine may further be for: computing a Fourier transform of a frame of the virtual sound source signal to obtain an input signal spectrum; multiplying the input signal spectrum with the source-to-speaker transfer function for each of the plurality of speakers to obtain an output signal spectrum for each of the plurality of speakers; computing an inverse Fourier transform of the output signal spectrum for each of the plurality of speakers to arrive at an output signal for each of the plurality of speakers; and outputting the output signal for each of the plurality of speakers.

Yet another implementation includes a tracker system for tracking a position of a listener and outputting listener position data to the computing machine. Then, the computing machine is further for determining that the listener position has changed to a new location, calculating a new location of the sweet spot region based on the new location of the listener, and computing a new pseudo-inverse using the new location of the sweet spot region.

Still further, another implementation includes an authoring tool for editing a location of the virtual sound source and outputting virtual sound source location data to the signal processing machine. Then, the signal processing machine is further for determining that the virtual sound source has been changed to a new location and, for each frequency bin, multiplying a new right-hand side of the linear system of equations for the new location of the virtual sound source with the pseudo-inverse to arrive at a new source-to-speaker transfer function for each of the plurality of speakers.

Other features and advantages of the invention will be set forth in, or apparent from, the detailed description of exemplary embodiments of the invention found below.

BRIEF DESCRIPTION OF THE SEVERAL VIEWS OF THE DRAWINGS

These and other features, aspects, and advantages of the present invention will become better understood with regard to the following description, appended claims, and accompanying drawings where:

DETAILED DESCRIPTION OF EXEMPLARY EMBODIMENTS OF THE INVENTION

Sound signals encoded over multiple speakers can create the perception of specific spatial properties. Rendering sound with spatial properties is useful for creating virtual and immersive environments. Disclosed herein is an exemplary system and method for rendering audio signals using an arbitrary arrangement of speakers. The method matches a multipole expansion of an original source wave field to a field created by the available speakers. A Galerkin-based Method of Moments approach minimizes the error on a sphere around a listener's head while exploiting the orthogonality of the underlying basis functions to reduce computational complexity. For an arbitrarily shaped sweet spot, a point-matching approach could also be used in developing a linear system of equations. The resulting over-determined system of equations is solved via a Singular-Value Decomposition (SVD) to obtain source-to-speaker transfer functions, which represent the activation sequence for the speakers to generate the spatial impression.

Being a sweet-spot solution, the exemplary system and method renders virtual sources in a small area around a single listener's head, thereby reducing the number of speakers needed for a comparable performance using WFS and can potentially be more useful in immersive environments.

Figure 1:
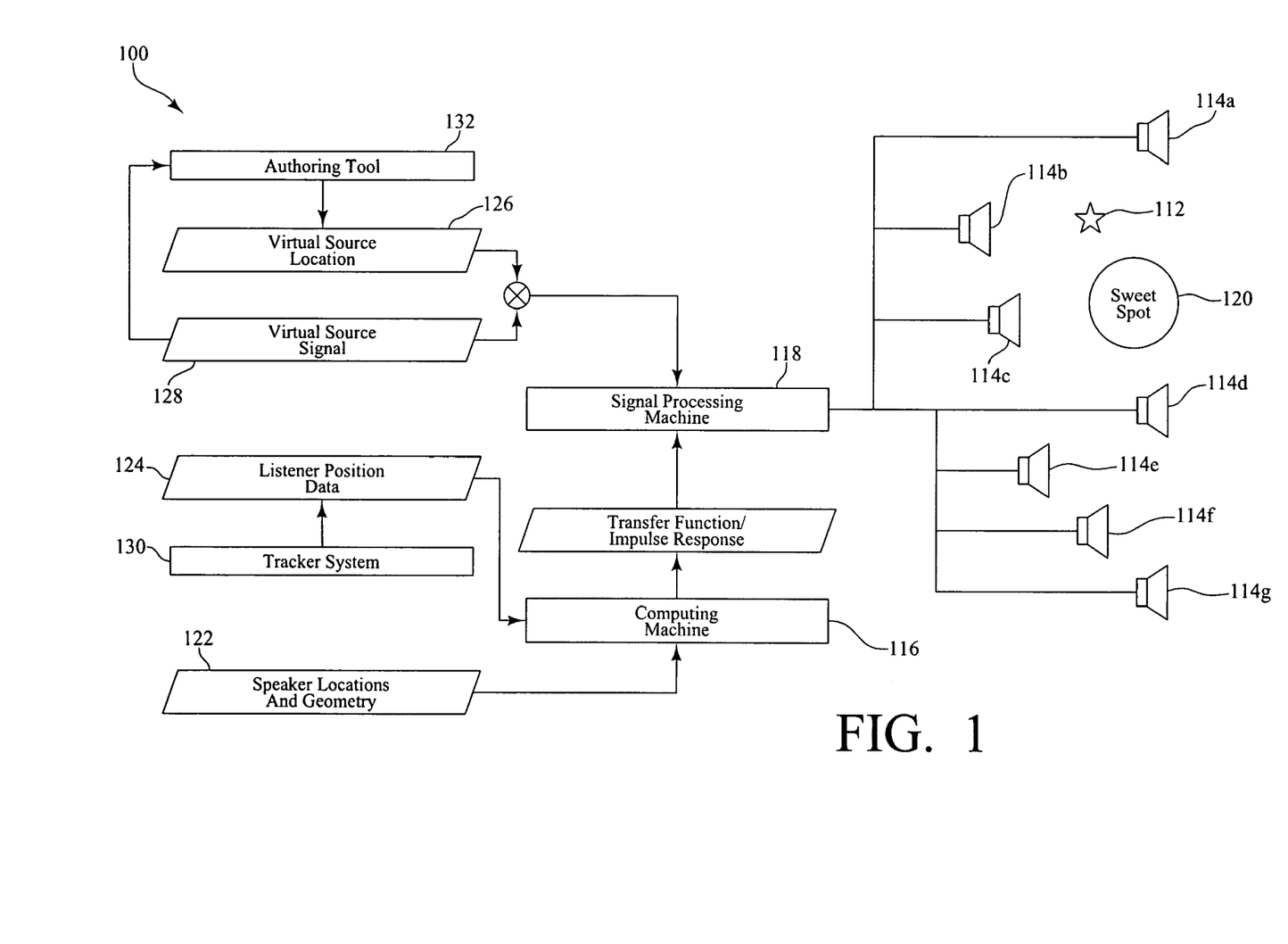
FIG. 1 is a functional block diagram of an exemplary system for rendering a virtual sound source using a plurality of speakers in an arbitrary arrangement.

FIG. 1 is a schematic diagram of an exemplary system 100 for rendering a virtual sound source 112 using a plurality of speakers 114a-114g in an arbitrary arrangement, including a computing machine 116 and a signal processing machine 118. Also shown is a sweet spot 120 positioned at a particular listener location. The virtual sound source 112 is shown positioned at a particular virtual sound source location. The computing machine 116 is any machine that is configured to perform the computing steps of the method described below, but is preferably a microprocessor, or the like. Likewise, the signal processing machine 118 is any machine that is configured to perform the signal processing steps of the method described below, but is preferably a digital signal processor (DSP), or the like.

It is noted that the boundaries between current microprocessors and DSPs are becoming less distinct. Many general purpose computers are now capable of performing the functions of DSPs with equivalent speed. However, in keeping with convention, the component performing computing functions will be referred to herein as the computing machine 116, and the component performing signal processing function will be referred to as the signal processing machine 118, recognizing, of course, that both the computing machine 116 and the signal processing machine 118 may be combined into a single component that performs both functions without departing from the spirit of scope of the claimed invention. However, it should also be noted that the computing machine 116 may be used to pre-compute parameters, described below, that need only be computed once, and that such pre-computing could be performed remote from the signal processing machine 118.

In use, the exemplary system 100 approximates a sound pressure field that appears to be emanated by the virtual sound source 112, which may be moving or stationary, using the speakers 114a-114g (i.e., actual sound sources) positioned at arbitrary locations so that the pressure fields emanated from the speakers 114a-114g at the particular listener location differ as little as possible from that that the virtual sound 112 source would generate.

Assuming that the pressure fields emanated from the virtual sound source 112 and the speakers 114a-114g are spherical waves, the pressure fields are first expanded into multipoles. With respect to the virtual sound source 112, the multipole expansion replaces the virtual sound source 112 with a number of virtual sources located at the coordinate system origin (i.e., a monopole source, a dipole source, a quadrapole source, an octopole source, and so on, in an infinite series expansion). Advantageously, the center of the head of the listener may be used as the coordinate system origin. By extending the expansion to infinity, the wave field of the virtual sound source 112 can be recreated exactly anywhere in space outside of particular virtual sound source location. Further, since the particular virtual sound source location is known, the expansion coefficients are also known. The same process can be duplicated for each of the speakers 114a-114g, except the expansion coefficients are unknown.

More specifically, the following is a derivation of the basic sound rendering algorithm for a simple tone. Consider a sound field p(r) described by the homogeneous Helmholtz equation:

$$\Delta p(r) + k^2 p(r) = 0 \tag{1}$$

where r is a vector denoting spatial position and k is the wave number. Any solution to equation (1) can be expanded in spherical coordinates as:

$$p(r) = \sum_{n=0}^{\infty} \sum_{m=-n}^{+n} a_{n,m} z_n(kr) Y_{n,m}(\vartheta, \varphi), \tag{2}$$

where r denotes the radial component, θ the azimuth angle, and φ the elevation angle of r, and $z_n$ is a suitable spherical cylinder function of order n. The $Y_{n,m}$ are spherical harmonics related to the Associated Legendre Functions of the First Kind, $P_n^m$ by:

$$Y_{n,m}(\vartheta, \varphi) = \sqrt{\frac{2n+1}{4\pi} \frac{(n-m)!}{(n+m)!}} P_n^m(\cos\vartheta) e^{jm\varphi}. \tag{3}$$

It is noteworthy that the expansion of any pressure field according to equation (2) is valid in any source-free region as it is expanded in terms of solutions to the homogeneous Helmholtz equation. For the expansion of fields generated by point sources, this means it is valid everywhere except at the location of that source, although it might not converge quickly if the source and observation points are in close proximity.

For the solution, assume a time dependency of $e^{+j\omega t}$ and that in free space it satisfies the Sommerfeld radiation condition. Based on these assumptions, a spherical Hankel function of the second kind $h_m^{(2)}$ must be chosen for the radial dependency, which results in:

$$f(r) = \sum_{n=0}^{\infty} \sum_{m=-n}^{+n} a_{n,m} h_n^{(2)}(kr) Y_{n,m}(\vartheta, \varphi). \tag{4}$$

The n=0, 1, 2 terms in equation (4) correspond to the pressure fields generated by a monopole, dipole, and quadrapole, respectively, located at the origin, with m describing the possible unique spatial orientations.

The orthogonality relation for the spherical harmonics can be expressed as:

$$\int_0^\pi \int_0^{2\pi} Y_{n,m}(\vartheta, \varphi) Y_{n',m'}^*(\vartheta, \varphi) \sin\vartheta \, d\vartheta \, d\varphi = \delta_{n,n'} \delta_{m,m'}, \tag{5}$$

where $\delta_{i,j}$ is the Kronecker delta. This relation is classically used to determine the multi-pole amplitudes $a_{n,m}$ given the knowledge of the pressure on a spherical boundary or to determine the weights for a spherical speaker array. Both approaches are based on Green's Second Theorem that links a field in a region subject to the Helmholtz equation to its boundary values, where the region of interest is then a sphere to exploit the orthogonality expressed in equation (5). The following derivation develops an alternative way to determine multi-pole amplitudes that is flexible enough to include speakers located at arbitrary locations, while still exploiting the orthogonality relation on a suitable sphere.

A single-frequency and omni-directional sound source emanates a spherical pressure wave of the form:

$$p_s(r_l, r'_s) = A_s \frac{e^{-jk|r_l - r'_s|}}{4\pi|r_l - r'_s|}, \quad (6)$$

where $r'_l$ denotes the particular listener location and $r'_s$ denotes the particular source location (by convention, primed coordinates refer to source points, whereas unprimed coordinates refer to observation points). For the sake of simplicity, assume a unit amplitude for $A_s$ and that each source emanates a spherical pressure wave weighted by an unknown complex coefficient $A_i$ (the complex "speaker weight") so that the composite sound field is given by:

$$p(r_l, r'_1, \ldots, r'_N) = \sum_{i=1}^{N} A_i \frac{e^{-jk|r_l - r'_i|}}{4\pi|r_l - r'_i|}, \quad (7)$$

where $r'_i$ denotes the location of the i-th speaker.

Since there are only a limited number of speakers available, the two wave fields will differ by an error term, such that $$p_s(r_l, r_s') = p(r_l, r'_1, \ldots, r'_N) + e(r_l, r'_1, \ldots, r'_N). \quad (8)$$

The spherical-multi-pole expansion of the scalar free-space Green's function is given by $$\frac{e^{-jk|r-r'|}}{4\pi|r-r'|} = -jk \sum_{n=0}^{\infty} j_n(kr_<) h_n^{(2)}(kr_>) \sum_{m=-n}^{+n} Y_{n,m}(\vartheta, \varphi) Y_{n,m}^*(\vartheta', \varphi'), \quad (9)$$

(Williams, Earl George, *Fourier Acoustics*, Academic Press, New York, N.Y., 1999, p. 259, eq. 8.22), where the following definition holds for the radial coordinate:

$$r_> = \begin{cases} r, & r > r' \\ r', & r < r' \end{cases} \text{ and } r_< = \begin{cases} r, & r < r' \\ r', & r > r' \end{cases} \quad (10)$$

$j_n$ is the spherical Bessel function, which ensures that the regularity condition for the field is satisfied at the origin.

The expressions for the pressure waves of equation (8) are now replaced with their corresponding multi-pole expansions according to equation (9):

$$\sum_{n=0}^{\infty} j_n(kr_{<(l,s)}) h_n^{(2)}(kr_{>(l,s)}) \sum_{m=-n}^{+n} Y_{n,m}(\vartheta_l, \varphi_l) Y_{n,m}^*(\vartheta'_s, \varphi'_s) = \quad (11)$$

$$\sum_{i=1}^{N} A_i \sum_{n=0}^{\infty} j_n(kr_{<(l,i)}) h_n^{(2)}(kr_{>(l,i)}) \sum_{m=-n}^{+n} Y_{n,m}(\vartheta_l, \varphi_l) Y_{n,m}^*(\vartheta'_i, \varphi'_i) +$$

$$e(r_l, r'_1, \ldots, r'_N)$$

Thus, the expansion of the source and the composite speaker field are set equal to each other (i.e., matched), centered at the location of the sweet spot 120 (FIG. 1), also adding an error term to the composite speaker field. Equation (11) describes the approximation.

A first analysis of equation (11) gives interesting insight into the nature of the expansion. Initially, one might be tempted to put a single listening element in the origin, such that $r_l = 0$ and thus $r_{<(l,s)} = r_{<(l,i)} = r_l = 0$ and consequently $r_{>(l,s)} = r'_s$ and $r_{>(l,i)} = r'_i$. However, since $$j_n(0) = \begin{cases} 1, & n = 0 \\ 0, & n > 0 \end{cases} \quad (12)$$

(i.e., the Bessel function of order 0 is one at the origin, and the Bessel function of higher orders are zero at the origin) this would effectively eliminate all the higher-order modes, which carry the directional information. This situation corresponds to a single sensor (an ear or a microphone) in the center of a sphere, and it should be clear that a stationary listener with one sensor (ear) cannot perceive the direction to a source.

Fortunately, if the listener's head is centered the origin, the ears are not located at the origin but rather at a constant distance $r_l > 0$ from it. Assuming that the actual source as well as all the speakers are always located outside the listener's head implies that $r_{<(l,s)} = r_l$ and $r_{>(l,s)} = r'_s$ for the source and $r_{<(l,i)} = r_l$ and $r_{>(l,i)} = r'_i$ for the speakers. This has the added benefit of excluding the only point for which the multi-pole expansion (11) does not converge. In addition, the field in the region of interest is source-free, which ensures a correct representation of the field emanating from the source as well as a rapid convergence of the expansion.

Equation (11) can be rewritten to reflect the conditions above:

$$\sum_{n=0}^{\infty} j_n(kr_l) h_n^{(2)}(kr'_s) \sum_{m=-n}^{+n} Y_{n,m}(\vartheta_l, \varphi_l) Y_{n,m}^*(\vartheta'_s, \varphi'_s) = \quad (13)$$

$$\sum_{i=1}^{N} A_i \sum_{n=0}^{\infty} j_n(kr_l) h_n^{(2)}(kr'_i) \sum_{m=-n}^{+n} Y_{n,m}(\vartheta_l, \varphi_l) Y_{n,m}^*(\vartheta'_i, \varphi'_i) +$$

$$e(r_l, r'_1, \ldots, r'_N).$$

The computing machine 116 in cooperation with the signal processing machine 118 (FIG. 1) are used to solve the $A_i$ values in the above equation, with the condition that the solution must minimize the error between the composite wave field generated by the plurality of speakers 114*a*-114*g* and the virtual sound source wave field of the virtual sound source 112 around the sphere of the sweet spot 120 in an immersive virtual auditory environment, as described below.

To this end the error term in equation (13) is integrated over the sphere of the sweet spot 120 with the spherical harmonics as the test functions, mandating that the average error on this sphere becomes zero, i.e., $$\int_0^\pi \int_0^{2\pi} e(r_l, r'_1, \ldots, r'_N) Y^*_{n,m}(\vartheta_l, \varphi_l) r_l \sin\vartheta_l d\vartheta_l d\varphi_l \stackrel{!}{=} 0. \quad (14)$$

The reasons for using this Galerkin approach instead of a point matching approach that would eliminate the error at the listener's ears are:

1. The Galerkin approach yields a much lower computational complexity since the orthogonality of the function systems involved can be exploited.
2. The rendering quality will be independent of a listener's orientation.
3. Tracking a listener's orientation is much more difficult than tracking a listener's position.

The orthogonality relation (5) for the spherical harmonics filters out a single term from the sums over m and n in equation (13), resulting in:

$$j_n(kr_l)h_n^{(2)}(kr'_s)Y^*_{n,m}(\vartheta'_s, \varphi'_s) = \sum_{i=1}^N A_i j_n(kr_l)h_n^{(2)}(kr'_i)Y_{n,m}(\vartheta'_i, \varphi'_i). \quad (15)$$

Note that the Bessel function $j_n(kr_l)$ on the right-hand side is constant with respect to the summation and could technically be eliminated from the equation. Doing so, however, changes the range and null space of the SVD (which is ultimately used to solve for the unknown speaker weights) that affects the rendering results. Since the function values can be pre-computed during matrix setup (discussed below), keeping the function does not significantly affect performance but does improve rendering quality. Keeping the Bessel function on both sides of the equation is important for numerical stability when using a limited number of terms. For fixed argument and increasing index, the Bessel functions approach zero while the Neumann functions $Y_n$ making up the imaginary part of the Hankel functions go to negative infinity. More specifically, since $$J_n(z) \sim \frac{1}{\sqrt{2\pi n}} \left(\frac{ez}{2n}\right)^n \quad (16)$$

and $$Y_n(z) \sim \sqrt{\frac{2}{\pi n}} \left(\frac{ez}{2n}\right)^{-n}, \quad (17)$$

(Milton Abramowitz and Irene A. Stegun, *Handbook of Mathematical Functions*, National Bureau of Standards, December 1972, p. 365), their product eventually approaches zero, ensuring convergence and extending the maximum number of radial modes that can be taken into account within the limits of the floating point unit.

Then, the next step is to minimize the error while developing a set of equations to solve for the unknown expansion coefficient for the speakers.

Equation (15) can be written in matrix form as $$[C_{j,i}][A_i]=[B_j]. \quad (18)$$

The index j is related to n and m by $$j=n^2+n+m, \text{ where } n=0,\ldots,N_R \text{ and } m=-n,\ldots,+n, \quad (19)$$

and $N_R$ is the number of radial modes.

Let $N=N_R^2$, and S be the number of speakers. Then C is an N×S matrix, A is an S×1 column vector and B is an N×1 column vector.

The matrix entries are:

$$C_{j,i}=j_n(kr_l)h_n^{(2)}(kr'_i)Y_{n,m}(\theta'_i,\phi'_i). \quad (20)$$

The elements $A_i$ are the unknown speaker weights of equation (18) and the right-hand side elements are:

$$B_j=j_n(kr_l)h_n^{(2)}(kr'_s)Y_{n,m}(\theta'_s,\phi'_s). \quad (21)$$

Each radial mode n adds 2n+1 rows to the matrix. While the number of speakers is fixed for a given setup, the number of modes can be independently chosen. Increasing the number of radial modes dramatically increases the number of spherical harmonics, and in most cases results in an over-determined system, although for a large number of speakers an underdetermined system may result (especially when the speaker, source, and listener geometry presents an unfeasible situation for rendering).

The over-determined or underdetermined system of equations can then be solved using a SVD of the matrix to obtain a least-squares approximation of the speaker weights A. The singular values represent the optimal subset of the available spherical harmonics. The SVD of matrix C is given by:

$$C=U\Sigma V^H, \quad (22)$$

where the superscript H denotes the Hermitian. U is N×N, $\Sigma$ is N×S, and $V^H$ is S×S. The pseudo-inverse $C^+$ is then of dimension S×N and can be computed by $$C^+=V\Sigma^+ U^H \quad (23)$$

where $\Sigma^+$ is obtained by replacing the non-zero singular values in $\Sigma$ by their respective inverse. It is worth noting that the matrix elements in equation (20) only depend on the speaker and listener location, so that the SVD only needs to be computed once (assuming stationary speakers and listener). Using the pseudo-inverse $C^+$, the repeated solution of the system for a moving source reduces to setting up the right-hand side B according to equation (21) and a subsequent simple matrix-vector multiplication $$A=C^+B. \quad (24)$$

The above algorithm is derived for a simple tonal signal. The method can be repeated and applied in parallel over a sub-band decomposition for wideband sources, as described below.

It is noted that the "sweet spot" described above is spherical in nature because of computational efficiency. However, one of skill in the art will recognize that a point-matching or collocation approach, as opposed to the Galerkin approach, may be utilized to arrive at a set of linear equations for use with an arbitrarily shaped "sweet spot," although such an approach would produce a very much larger set of equations and, therefore, would significantly increase computational complexity. The point-matching approach includes evaluating the equation at discrete points (i.e., inserting delta functions into the equation). Advantageously, though, for such an arbitrarily shaped "sweet spot" that is stationary, the computation would only have to be performed once. Thus, even if an extended amount of computation is required, the computation would only have to be performed once.

Thus, returning to FIG. 1, inputs to the computing machine 116 are speaker location and geometry data 122 and listener location data 124, which allows the computing machine 116 to compute the pseudo-inverse via the SVD. Inputs to the signal processing machine 118 are virtual source location data 126 and the virtual source signal 128, which allows the signal processing machine 118 to compute the right-hand side, and use the pseudo-inverse to generate an output signal for each of the plurality of speakers 114a-114g.

Figure 2:
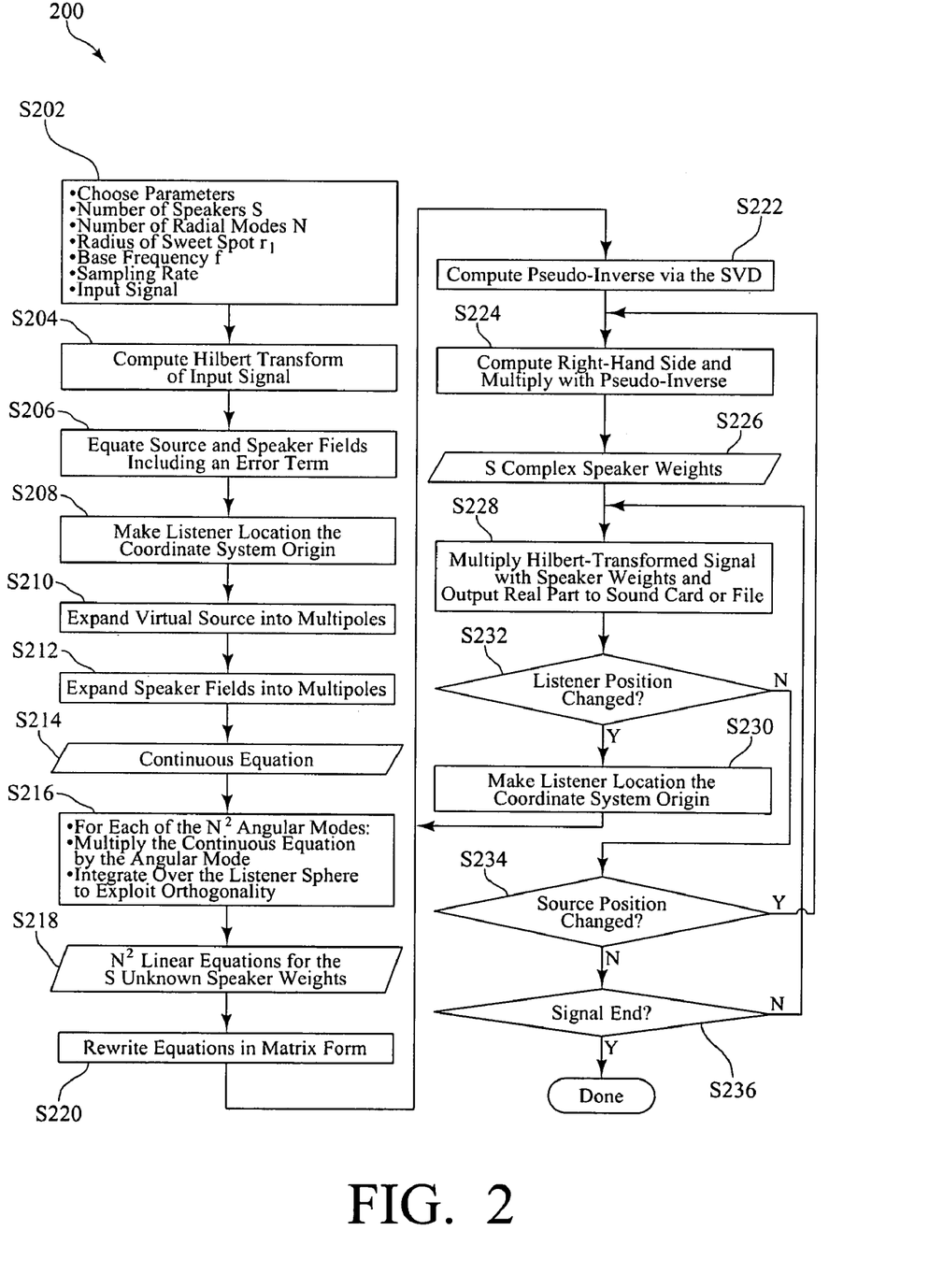
FIG. 2 is a flow chart of an exemplary single-band method 200 for rendering a virtual sound source using a plurality of speakers in an arbitrary arrangement.

FIG. 2 is a flow chart of an exemplary single-band method 200 for rendering a virtual single-band sound source using a plurality of speakers in an arbitrary arrangement.

The exemplary single-band method 200 includes the preliminary steps of: S202 choosing parameters; S204 transforming a virtual sound source signal (i.e., input signal) into the frequency domain; S206 equating a virtual sound source wave field of the virtual sound source to a composite wave field generated by the plurality of speakers, plus an error term; and S208 making a particular listener location an origin of a coordinate system to be used in multi-pole expansions described below.

The step S202 of choosing parameters includes choosing the number of speakers S, the number of radial modes N, the radius of the "sweet spot" (i.e., a sphere around the listener's head) $r_l$, a base frequency f, and an input signal.

The step S204 of transforming the virtual sound source signal into the frequency domain may comprise computing the Hilbert Transform of the input signal.

The exemplary single-band method 200 continues with the steps of: S210 expanding the virtual sound source wave field into a virtual sound source multi-pole expansion; S212 expanding the composite wave field into a composite wave field multi-pole expansion; and S214 establishing a continuous equation equating (i.e., matching) the virtual sound source multi-pole expansion to the composite wave field multi-pole expansion plus the error term.

In step S216, the continuous equation is multiplied by an angular mode for each of $N^2$ angular modes, and integrated over the sphere around the listener's head (to exploit orthogonality, as described above) mandating zero average error on the sphere. The result is step S218, the creation of $N^2$ linear equations for S unknown speaker weights. This is typically an over-determined system of linear equations.

Step S220 is rewriting the equations in matrix form, and step S222 is computing a pseudo-inverse by solving the linear equations in the least-square optimal sense by applying the SVD. The result is a selection of the multi-pole modes that are most relevant for the rendering of the virtual sound source, ensuring the optimal set of multi-pole expansions is matched from the virtual sound source wave field to the composite wave field. The resulting pseudo-inverse then represents a multi-dimensional transfer function between the virtual source and the speakers in the system.

Then, step S224 is, for every point where a virtual sound source is located, computing the right-hand side of the matrix equation according to the algorithm, and then perform a matrix-vector multiplication with the pseudo-inverse to arrive, in step S226, at the complex speaker weights (i.e., coefficients).

In step S228, the complex speaker weights are multiplied with the Hilbert-transformed input signal, and the real part is used to drive the speakers (i.e., output to a sound card) or is saved to a file.

Advantageously, the exemplary single-band method 200 allows for the movement of the listener and/or the virtual sound source. Step S230 is determining if the listener position has changed. If so, then step S232 is making the new listener location the new coordinate system origin, and continuing to step S222 computing the pseudo-inverse via the SVD using the new coordinate system origin. If the listener position has not changed, then step S234 is determining if the source position has changed. If so, then continuing to step S224 to compute the new right-hand side of the matrix equation, and S226 computing the new complex speaker weights for the new source position.

Step S236 is determining if the signal has ended. If not, then continuing to step S228 and continuing to drive the speakers.

Figure 3:
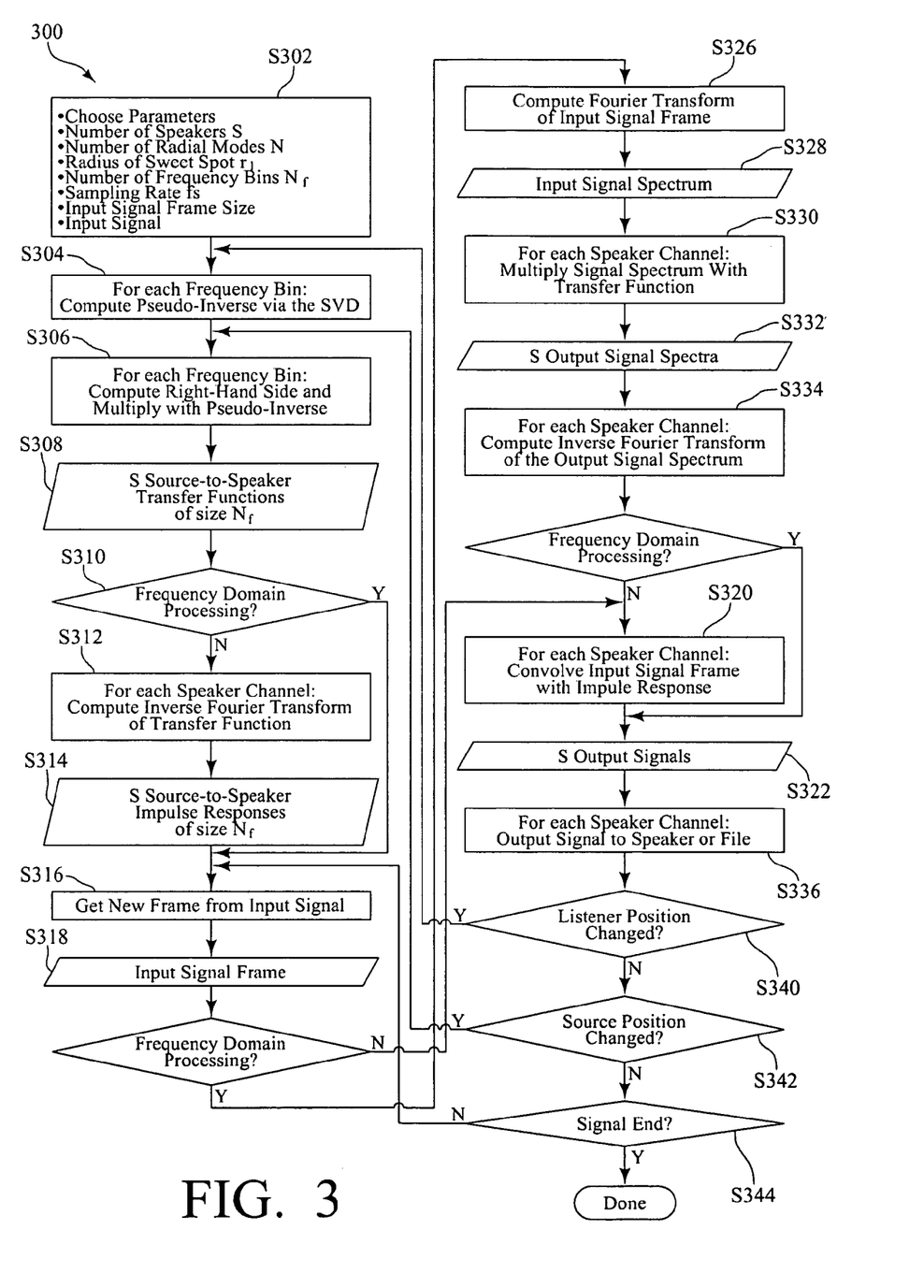
FIG. 3 is a flow chart of an exemplary broadband method 300 for rendering a virtual sound source using a plurality of speakers in an arbitrary arrangement.

FIG. 3 is a flow chart of an exemplary broadband method 300 for rendering a virtual broadband (i.e., multi-band) sound source using a plurality of speakers in an arbitrary arrangement.

The exemplary broadband method 300 includes the preliminary step of S302 choosing a number of parameters. Similar to the exemplary method 200, the exemplary method 300 includes choosing the number of speakers S, the number of radial modes N, the radius of the "sweet spot" (i.e., a sphere around the listener's head) $r_l$, a sampling rate $f_s$, and an input signal. However, the exemplary method 300 also includes choosing a number of frequency bins $N_f$, and an input signal frame size.

"Frequency bins" are also known as sub-bands. For instance, if a 10 kHz signal is divided into 10 sub-bands of 1 kHz each, each 1 kHz sub-band would be a bin.

A "signal frame" is a fixed size (temporal) portion of an input signal that is processed by a DSP, and is usually closely related to the input and output buffer size of the DSP hardware. For instance, a signal sampled at 44.1 kHz has 44,100 samples per second. A typical DSP will process the data using 256 samples at any given time. Thus, the frame size is 256. If the input signal has multiple channels, the signal frame may be taken across all of the channels.

The exemplary broadband method 300 continues with the steps of for each frequency bin: S304 computing the pseudo-inverse via the SVD; S306 computing the right-hand side and multiplying with the pseudo-inverse; and S308 arriving at S source-to-speaker transfer functions.

The matching occurs in the frequency domain, meaning that any signal processing is done in sub-bands using a Fourier Transform (e.g., a Fast-Fourier Transform (FFT) or a Discrete Fourier Transform (DFT)) and the above-described method ("multi-pole-matched rendering" or "MMR") subsequently applied to each sub-band in either the time domain or the frequency domain. In a time domain process, each sub-band MMR transfer function is transformed back into the time domain using an inverse transform to obtain a set of impulse responses corresponding to a given set of source, speaker and listener positions. Rendering is then achieved by computing the convolution of the input signal with each of the impulse responses and subsequent superposition per sub-band and output channel. Alternatively, in a frequency domain process, the input signal is Fourier-Transformed, the resulting sub-band decomposition multiplied with the transfer functions, and the results are transformed back into the time domain for final output.

Thus, step S310 is determining if the process will continue in the frequency domain or in the time domain.

If processing following computing of the transfer functions (step S308) continues in the time domain, then step S312 is computing an inverse Fourier Transform of the transfer functions to arrive, in step S314, at S source-to-speaker impulse responses for each frequency bin. Following this, in steps S316 and S318, a new frame from the input signal is obtained, and in step S320 the input signal frame is convolved with the impulse responses for each speaker channel to arrive, in step S322, at S output signals.

If processing following computing of the transfer functions (step S308) continues in the frequency domain, then the method proceeds directly to steps S316 and S318, obtaining a new frame from the input signal. In step S326, the Fourier Transform of the input signal frame is computed to arrive, in step S328, at the input signal spectrum. In step S330, for each speaker channel, the signal spectrum is multiplied with the transfer functions to arrive, in step S332, at S output signal spectra. Then, in step S334, for each speaker channel, an inverse Fourier Transform of the output signal spectrum is computed to arrive, in step S322, at S output signals.

In step S336, for each speaker channel, the output signal is output to the speakers or to a file.

As with the exemplary single-band method 200, the exemplary broadband method 300 allows for the movement of the listener and/or the virtual sound source. Step S340 is determining if the listener position has changed. If so, then the processing resumes with step S304, computing a new pseudo-inverse via the SVD for each frequency bin based on the listener position. If the listener position has not changed, then step S342 is determining if the source position has changed. If so, the processing resumes with step S306, computing the right-hand side and multiplying with the pseudo-inverse to arrive, in step S308, at S source-to-speaker transfer functions for each frequency bin. If neither the listener position nor the source position have changed, then, step S344 is determining if the signal has ended. If not, then processing resumes at step S310, and, if so, then, of course, the processing ends.

Returning again to FIG. 1 a tracking system 430 is included to track the position of the listener, and to output listener position data 124 to the computing machine 116, so that the computing machine 116 can calculate a new location of the sweet spot if the listener location changes, and compute a new pseudo-inverse for the new location of the sweet spot. Additionally, an authoring tool 132 allows authoring/editing of the virtual source position data 126, either in real-time or off-line, for rendering of a moving virtual source by the signal processing machine 118.

Thus, the invention provides a method and system for rendering a virtual sound source using a plurality of speakers in an arbitrary arrangement. It should be noted that while the description above primarily refers to the rendering of a single virtual sound source, one of skill in the art will recognize that the method and system described herein may be applied to the rendering of a plurality of virtual sources without departing from the spirit or the scope of the claimed invention.

One of ordinary skill in the art will recognize that additional steps and configurations are possible without departing from the teachings of the invention. This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

What is claimed is:

1. A method for spatially rendering a virtual sound source using a plurality of speakers in an arbitrary arrangement, comprising:
    expanding a virtual sound source wave field of the virtual sound source into a virtual sound source wave field multi-pole expansion;
    expanding a composite wave field generated by the plurality of speakers into a composite wave field multi-pole expansion;
    equating the virtual sound source wave field multi-pole expansion to the composite wave field multi-pole expansion to form a continuous equation;
    applying a set of constraints to the continuous equation that minimize an error in a sweet spot region, resulting in a linear system of equations;
    solving the linear system of equations using singular-value decomposition to arrive at a pseudo-inverse representing a source-to-speaker transfer function between the virtual sound source and each of the plurality of speakers; and
    applying the source-to-speaker transfer functions to a virtual sound source signal of the virtual sound source to spatially render the virtual sound source in the sweet spot region using the plurality of speakers in the arbitrary arrangement.

2. The method of claim 1, wherein the sweet spot region is arbitrarily shaped, and wherein applying the set of constraints further comprises using a Point-Matching Method of Moments approach to minimize the error at discrete points in the sweet spot region.

3. The method of claim 1, wherein the sweet spot region is spherical, and wherein applying the set of constraints further comprises using a Galerkin-based Method of Moments approach to minimize an average error on a boundary of the sweet spot region.

4. The method of claim 1, wherein the virtual sound source signal is a broadband signal having a plurality of frequency bins, and wherein applying the multi-dimensional transfer function to the virtual sound source signal further comprises, for each frequency bin, multiplying a right-hand side of the linear system of equations with the pseudo-inverse to arrive at the source-to-speaker transfer function for each of the plurality of speakers.

5. The method of claim 4, wherein applying the multi-dimensional transfer function to the virtual sound source signal further comprises:
    computing an inverse Fourier transform of each source-to-speaker transfer function to arrive at a source-to-speaker impulse response for each of the plurality of speakers;
    convolving a frame of the virtual sound source signal with the source-to-speaker impulse response for each of the plurality of speakers to arrive at an output signal for each of the plurality of speakers; and
    outputting the output signal for each of the plurality of speakers.

6. The method of claim 4, wherein applying the multi-dimensional transfer function to the virtual sound source signal further comprises:
    computing a Fourier transform of a frame of the virtual sound source signal to obtain an input signal spectrum;
    multiplying the input signal spectrum with the source-to-speaker transfer function for each of the plurality of speakers to obtain an output signal spectrum for each of the plurality of speakers;
    computing an inverse Fourier transform of the output signal spectrum for each of the plurality of speakers to arrive at an output signal for each of the plurality of speakers; and
    outputting the output signal for each of the plurality of speakers.

7. The method of claim 4, further comprising determining that the sweet spot region has moved to a new location and computing a new pseudo-inverse using the new location of the sweet spot region.

8. The method of claim 4, further comprising determining that the virtual sound source has moved to a new location and, for each frequency bin, multiplying a new right-hand side of the linear system of equations for the new location of the virtual sound source with the pseudo-inverse to arrive at a new source-to-speaker transfer function for each of the plurality of speakers.

9. A system for spatially rendering a virtual sound source using a plurality of speakers in an arbitrary arrangement, comprising:
   a computing machine for solving a linear system of equations using singular-value decomposition to arrive at a pseudo-inverse representing a source-to-speaker transfer function between the virtual sound source and the plurality of speakers, the linear system of equations derived by:
      expanding a virtual sound source wave field of the virtual sound source into a virtual sound source wave field multi-pole expansion;
      expanding a composite wave field generated by the plurality of speakers into a composite wave field multi-pole expansion;
      equating the virtual sound source wave field multi-pole expansion to the composite wave field multi-pole expansion to form a continuous equation; and
      applying a set of constraints to the continuous equation that minimize an error in a sweet spot region, resulting in the linear system of equations; and
   a signal processing machine for applying the source-to-speaker transfer function to a virtual sound source signal of the virtual sound source to spatially render the virtual sound source in the sweet spot region using the plurality of speakers in the arbitrary arrangement.

10. The system of claim 9, wherein the sweet spot region is arbitrarily shaped, and wherein applying the set of constraints further comprises using a Point-Matching Method of Moments approach to minimize the error at discrete points in the sweet spot region.

11. The system of claim 9, wherein the sweet spot region is spherical, and wherein applying the set of constraints further comprises using a Galerkin-based Method of Moments approach to minimize an average error on a boundary of the sweet spot region.

12. The system of claim 9, wherein the virtual sound source signal is a broadband signal having a plurality of frequency bins, and wherein the signal processing machine is further for multiplying a right-hand side of the linear system of equations with the pseudo-inverse for each frequency bin to arrive at the source-to-speaker transfer function for each of the plurality of speakers.

13. The system of claim 12, wherein the signal processing machine is further for:
   computing an inverse Fourier transform of each source-to-speaker transfer function to arrive at a source-to-speaker impulse response for each of the plurality of speakers;
   convolving a frame of the virtual sound source signal with the source-to-speaker impulse response for each of the plurality of speakers to arrive at an output signal for each of the plurality of speakers; and
   outputting the output signal for each of the plurality of speakers.

14. The system of claim 12, wherein the signal processing machine is further for:
   computing a Fourier transform of a frame of the virtual sound source signal to obtain an input signal spectrum;
   multiplying the input signal spectrum with the source-to-speaker transfer function for each of the plurality of speakers to obtain an output signal spectrum for each of the plurality of speakers;
   computing an inverse Fourier transform of the output signal spectrum for each of the plurality of speakers to arrive at an output signal for each of the plurality of speakers; and
   outputting the output signal for each of the plurality of speakers.

15. The system of claim 12, further comprising a tracker system for tracking a position of a listener and outputting listener position data to the computing machine, and wherein the computing machine is further for determining that the listener position has changed to a new location, calculating a new location of the sweet spot region based on the new location of the listener, and computing a new pseudo-inverse using the new location of the sweet spot region.

16. The system of claim 12, further comprising an authoring tool for editing a location of the virtual sound source and outputting virtual sound source location data to the signal processing machine, and where the signal processing machine is further for determining that the virtual sound source has been changed to a new location and, for each frequency bin, multiplying a new right-hand side of the linear system of equations for the new location of the virtual sound source with the pseudo-inverse to arrive at a new source-to-speaker transfer function for each of the plurality of speakers.

\* \* \* \* \*